United States Patent
Zhang et al.

(10) Patent No.: US 11,964,316 B2
(45) Date of Patent: Apr. 23, 2024

(54) METHOD FOR REDUCING ODOR IN REMEDIATION OF PESTICIDE CHEMICAL CONTAMINATED SOIL

(71) Applicant: Nanjing Institute of Environmental Sciences, MEE, Nanjing (CN)

(72) Inventors: Shengtian Zhang, Nanjing (CN); Mei Li, Nanjing (CN); Lu Yang, Nanjing (CN); Jinzhong Wan, Nanjing (CN); Qun Li, Nanjing (CN); Tingting Fan, Nanjing (CN); Yan Zhou, Nanjing (CN); Yuanchao Zhao, Nanjing (CN); Xiang Wang, Nanjing (CN)

(73) Assignee: Nanjing Institute of Environmental Sciences, MEE, Nanjing (CN)

( * ) Notice: Subject to any disclaimer, the term of this patent is extended or adjusted under 35 U.S.C. 154(b) by 0 days.

(21) Appl. No.: 18/072,710

(22) Filed: Dec. 1, 2022

(65) Prior Publication Data
US 2023/0264242 A1    Aug. 24, 2023

(30) Foreign Application Priority Data
Feb. 23, 2022 (CN) .......................... 202210168310.9

(51) Int. Cl.
*B09C 1/06* (2006.01)
*B09C 1/10* (2006.01)

(52) U.S. Cl.
CPC ................ *B09C 1/06* (2013.01); *B09C 1/10* (2013.01); *B09C 2101/00* (2013.01)

(58) Field of Classification Search
CPC .......... B09C 1/06; B09C 1/10; B09C 2101/00
See application file for complete search history.

(56) References Cited

U.S. PATENT DOCUMENTS

2013/0136713 A1    5/2013    Terada et al.

FOREIGN PATENT DOCUMENTS

| CN | 1732019 A | 2/2006 |
|---|---|---|
| CN | 104399098 A | 3/2015 |
| CN | 109701489 A | 5/2019 |
| CN | 109731883 A | 5/2019 |
| CN | 111438170 A | 7/2020 |
| CN | 112316893 A | 2/2021 |
| CN | 112547781 A | 3/2021 |
| CN | 112974508 A | 6/2021 |
| CN | 113019328 A | 6/2021 |
| CN | 113100084 A | 7/2021 |
| CN | 114042744 A | 2/2022 |
| JP | 2005034057 A | 2/2005 |

OTHER PUBLICATIONS

Search Report, issued in CN202210168310.9 (priority application), by CNIPA, dated Feb. 23, 2022.
The notice of grant, issued in priority CN202210168310.9, dated Oct. 19, 2022.
Search report, commissioned by applicant, dated Aug. 2, 2022.

*Primary Examiner* — Iqbal H Chowdhury
(74) *Attorney, Agent, or Firm* — Zhu Lehnhoff LLP

(57) ABSTRACT

A method for reducing odor in remediation of pesticide chemical contaminated soil comprises preparing odor control sustained-release particles and evenly covering on the surface of the pesticide chemical contaminated soil according to a certain dosage; preparing odor covering base materials and mixed bacterial solution, and preparing the odor covering soil by mixing the odor covering base materials and mixed bacterial solution in proportion, and then covering the odor covering soil on the surface of the pesticide chemical contaminated soil; and inserting heating rods into the pesticide chemical contaminated soil, and heating the surface layer of the pesticide chemical contaminated soil to 30-40° C.

3 Claims, 1 Drawing Sheet

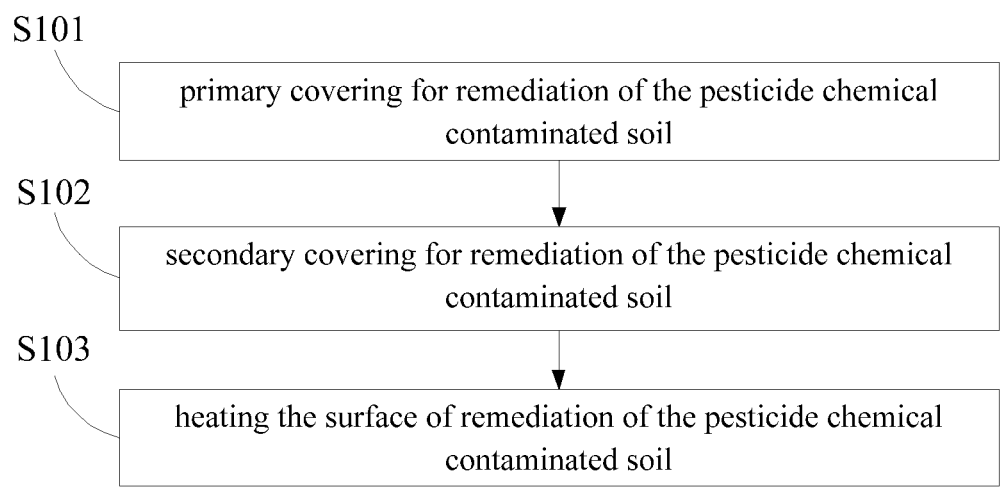

METHOD FOR REDUCING ODOR IN REMEDIATION OF PESTICIDE CHEMICAL CONTAMINATED SOIL

The present application claims the priority of Chinese Patent Application No. 202210168310.9, filed on Feb. 23, 2022, the disclosure of which is hereby incorporated by reference.

FIELD OF TECHNOLOGY

The invention relates to the technical field of soil odor treatment, in particular to a method for reducing odor in remediation of pesticide chemical contaminated soil.

BACKGROUND TECHNOLOGY

Pesticide contaminated sites are mostly distributed along rivers and sensitive receptor intensive areas, which are characterized by long production history and complex pollution components. Compared with general industrial pollution sites, they are more harmful and risky, which seriously threaten human health and ecological environment safety, and have become a major soil environment problem that needs to be solved urgently.

The odor problem of the pesticide contaminated sites is prominent. Once earthwork excavation is involved in the restoration, the problem of odor disturbing residents will become one of the most difficult problems in the restoration project. Even though the target pollutants in the pesticide contaminated soil have reached the standard value after remediation, the pesticide contaminated sites still emit unpleasant odor. Although the detected concentration of these odor gas is low and does not exceed the standard, the ambient air quality is affected to a certain extent.

For the treatment of odor from pesticide contaminated soil, mostly cover the non contaminated soil on the contaminated soil to block the diffusion of odor gas, or spray inhibitors, but these methods in the actual use of odor reduction are not effective; Therefore, there is a need for a new odor treatment method for remediation of pesticide chemical contaminated soil, so as to effectively reduce the odor of soil.

SUMMARY OF THE INVENTION

In order to solve the above technical problems, the invention provides a method for reducing odor in remediation of pesticide chemical contaminated soil.

The technical scheme of the invention is: a method for reducing odor in remediation of pesticide chemical contaminated soil, which comprises the following steps:

S101. primary covering the pesticide chemical contaminated soil odor control sustained-release particles are prepared and evenly covered on the surface of the pesticide chemical contaminated soil according to a certain dosage;

S102. secondary covering the pesticide chemical contaminated soil odor covering base materials and mixed bacterial solution are prepared, and the odor covering soil is prepared by mixing the odor covering base materials and mixed bacterial solution in proportion, and then the odor covering soil is covered on the surface of the pesticide chemical contaminated soil covered by step S101;

S103. heating the surface of the pesticide chemical contaminated soil heating rods are inserted into the pesticide chemical contaminated soil covered by step S102, and the surface layer of the pesticide chemical contaminated soil is heated to 30~40° C., and the odor control sustained-release particles and the odor odor covering soil are used to reduce the odor of the pesticide chemical contaminated soil.

Further, the dosage of the odor control sustained-release particles is 3~10% of the total weight of the pesticide chemical contaminated soil, under the premise of effectively controlling the pesticide chemical contaminated soil, the cost of odor treatment of the pesticide chemical contaminated soil can be reduced through the above addition proportion.

Further, the odor control sustained-release particle is composed of a base core and a core film for wrapping the base core, the base core is composed of absorbent powders, vermiculite powders and expansion particles in accordance with the mass ratio of 5~7:5~7:2 fully mixed and pressed into a particle size of 10~15 mm, the core film is a degradable film;

wherein, the expansion particle is composed of sodium bicarbonate and tartaric acid in accordance with the mass ratio of 4:1 mixed and pressed into a particle size of 2~5 mm;

Through the preparation of the odor control sustained-release particles, the absorbent powders in the odor control sustained-release particles can absorb the gas produced in the soil. Since the odor of the pesticide chemical contaminated soil is continuously emitted with the decomposition of substances, if the absorbent powders are directly covered on the surface of the pesticide chemical contaminated soil, the absorption duration of the absorbent powders is likely to be greatly shortened. The odor control sustained-release particles provided by the invention can effectively extend the reduction of odor of the pesticide chemical contaminated soil, and gradually sustainedly release with the water content and the temperature rise of the pesticide chemical contaminated soil, so that the sustained-release particles expand and the area where they are located will produce pores, thus improving the reduction effect and actuation duration of absorbent powders in the odor control sustained-release particles on odor of the soil.

Furthermore, the absorbent powder is one or more mixtures of bamboo charcoal powders and activated carbon powders in any ratios. The use of one or more mixtures in any ratios can meet the odor reduction effect of the pesticide chemical contaminated soil, but is not limited to above absorbent powders. Other absorbent powders that will not cause secondary pollution to soil can also be used instead.

Further, a method for preparing the odor covering base materials is:

1) weigh a certain amount of straw powders, add 0.5~2 L distilled water into each kilogram of the straw powders and mix well to get the mixed solution;

2) add 4~6 L hydrogen peroxide per kilogram of the straw powders into the mixed solution, stir for 2~3 h, and add 2~4 L ammonia per kilogram of the straw powders into the mixed solution, and the ammonia is slowly added at the flow rate of 40~50 mL/min, wherein, the mass fraction of the hydrogen peroxide is 30%, the mass fraction of the ammonia is 28%;

3) solids will be obtained by natural precipitation after reaction, and then dry the solids to obtain the odor covering base materials;

The odor covering base materials prepared by the above method can be grafted into lignin by nitrogen element to convert into ammoniated lignin, which can sustainedly release organic nitrogen under the action of microorganisms in the pesticide chemical contaminated soil, and has significant physical and chemical adsorption effect on the single odor gas or mixed odor gas in the pesticide chemical contaminated soil. Thus, it can effectively cover the pesticide chemical contaminated soil with odor blocking and odor reduction.

Further, the mixed bacterial solution is composed of one or more of Burkholderia, Bacillus subtilis, Taueria, Comamonas, pseudomonas, short-wave monomonas in any ratios; The mixed bacterial solution composed of one or more of the above mentioned in any ratio has a significant degradation effect in the treatment of odor gas in pesticide chemical contaminated soil, and has strong environmental adaptability. It can effectively cooperate with the odor covering base materials to reduce the odor of the pesticide chemical contaminated soil, effectively improve the diversity of bacteria in the pesticide chemical contaminated soil, and promote the remediation of the pesticide chemical contaminated soil.

Further, the odor covering soil consists of the odor covering base materials and mixed bacterial solution mixed according to the mass ratio of 7~9:2. The odor covering soil mixed with the above ratio has a significant treatment effect on the odor gas of the pesticide chemical contaminated soil, so as to effectively prevent the odor gas from overflowing from the pesticide chemical contaminated soil, and greatly reduce the odor gas of the pesticide chemical contaminated soil.

Further, the thickness of the surface layer of the odor covering soil covered on the pesticide chemical contaminated soil covered in step S101 is 30~50 cm.

The beneficial effects of the invention are:

(1) The method for reducing odor in remediation of pesticide chemical contaminated soil in the present invention can effectively reduce the odor gas, so as to avoid the air pollution around pesticide chemical contaminated soil caused by odor gas, and green environmental protection, will not pollute the soil twice, and and the method for reducing odor is simple and convenient.

(2) The method for reducing odor in remediation of pesticide chemical contaminated soil in the present invention, the existing odor inhibitors usually have a short duration and are difficult to maintain reducing the odor of the soil for a long time, and the odor problem of pesticide chemical contaminated soil can be solved for a long time by using the odor control sustained-release particles and the odor covering soil to coordinate with the treatment of odor gas spilled from pesticide chemical contaminated soil.

(3) The method for reducing odor in remediation of pesticide chemical contaminated soil in the present invention adopts a variety of ways to reduce the odor in remediation of pesticide chemical contaminated soil, which can be selected according to the actual treatment conditions and other factors.

BRIEF DESCRIPTION OF ATTACHED DRAWINGS

FIG. 1 is the flow chart of the method for reducing odor in remediation of pesticide chemical contaminated soil according to the invention.

SPECIFIC EMBODIMENTS

The invention will be further described in detail in combination with specific embodiments to better reflect the advantages of the invention.

Example 1

As shown in FIG. 1, a method for reducing odor in remediation of pesticide chemical contaminated soil, which comprises the following steps:

S101. primary covering the pesticide chemical contaminated soil odor control sustained-release particles are prepared and covered on the surface of the pesticide chemical contaminated soil with the odor control sustained-release particles at the dosage of 9% of the total weight of the pesticide chemical contaminated soil, under the premise of effectively controlling the pesticide chemical contaminated soil, the cost of odor treatment of the pesticide chemical contaminated soil can be reduced through the above addition proportion;

Wherein, the odor control sustained-release particle is composed of a base core and a core film for wrapping the base core, the base core is composed of absorbent powders, vermiculite powders and expansion particles in accordance with the mass ratio of 3:3:1 fully mixed and pressed into a particle size of 12 mm, the core film is a degradable film, specifically a commercially available corn protein packaging film; wherein, the expansion particle is composed of sodium bicarbonate and tartaric acid in accordance with the mass ratio of 4:1 mixed and pressed into a particle size of 4 mm; the absorbent powder is activated carbon powder; Through the preparation of the odor control sustained-release particles, the absorbent powders in the odor control sustained-release particles can absorb the gas produced in the soil; Since the odor of the pesticide chemical contaminated soil is continuously emitted with the decomposition of substances, if the absorbent powders are directly covered on the surface of the pesticide chemical contaminated soil, the absorption duration of the absorbent powders is likely to be greatly shortened; The odor control sustained-release particles provided by the invention can effectively extend the reduction of odor of the pesticide chemical contaminated soil, and gradually sustainedly release with the water content and the temperature rise of the pesticide chemical contaminated soil, so that the sustained-release particles expand and the area where they are located will produce pores, thus improving the reduction effect and actuation duration of absorbent powders in the odor control sustained-release particles on odor of the soil;

S102. secondary covering the pesticide chemical contaminated soil odor covering base materials and mixed bacterial solution are prepared, and the odor covering soil is prepared by mixing the odor covering base materials and mixed bacterial solution according to the mass ratio of 4:1, the odor covering soil mixed with the above ratio has a significant treatment effect on the odor gas of the pesticide chemical contaminated soil, thus effectively blocking the odor gas overflow of the pesticide chemical contaminated soil, and greatly reducing the odor gas of the pesticide chemical contaminated soil, and then the odor covering soil is covered on the surface of the pesticide chemical contaminated soil covered by step S101, with the covering thickness of 45 cm;

A method for preparing the odor covering base materials is:

1) weigh a certain amount of straw powders, add 1 L distilled water into 1 kilogram of the straw powders and mix well to get the mixed solution; 2) add 5 L hydrogen peroxide per kilogram of the straw powders into the mixed solution, stir for 2.5 h, and add 3 L ammonia per kilogram of the straw powders into the mixed solution at the same time, and the ammonia is slowly added at the flow rate of 45 mL/min, wherein, the mass fraction of the hydrogen peroxide is 30%, the mass fraction of the ammonia is 28%; 3) solids will be obtained by natural precipitation after reaction, and then dry the solids to obtain the odor covering base materials; The odor covering base materials prepared by the above method can be grafted into lignin by nitrogen element to convert into ammoniated lignin, which can sustainedly release organic nitrogen under the action of microorganisms in the pesticide chemical contaminated soil, and has significant physical and chemical adsorption effect on the single odor gas or mixed odor gas in the pesticide chemical contaminated soil. thus, it can effectively cover the pesticide chemical contaminated soil with odor blocking and odor reduction;

The mixed bacterial solution is composed of one or more of *Burkholderia, Bacillus subtilis*, Taueria, Comamonas, *pseudomonas*, short-wave monomonas in a mass ratio of 2:1:1:1:1; The mixed bacterial solution composed of one or more of the above mentioned components has a significant degradation effect in the treatment of odor gas in pesticide chemical contaminated soil, and has strong environmental adaptability, and it can effectively cooperate with the odor covering base materials to reduce the odor of the pesticide chemical contaminated soil, effectively improve the diversity of bacteria in the pesticide chemical contaminated soil at the same time, and promote the remediation of the pesticide chemical contaminated soil;

S103. heating the surface of the pesticide chemical contaminated soil heating rods are inserted into the pesticide chemical contaminated soil covered by step S102, and the surface layer of the pesticide chemical contaminated soil is heated to 35° C., and the odor control sustained-release particles and the odor odor covering soil are used to reduce the odor of the pesticide chemical contaminated soil.

Example 2

This example is basically the same as example 1, except that S101. odor control sustained-release particles are prepared and covered on the surface of the pesticide chemical contaminated soil with the odor control sustained-release particles at the dosage of 3% of the total weight of the pesticide chemical contaminated soil.

Example 3

This example is basically the same as example 1, except that S101. odor control sustained-release particles are prepared and covered on the surface of the pesticide chemical contaminated soil with the odor control sustained-release particles at the dosage of 10% of the total weight of the pesticide chemical contaminated soil.

Example 4

This example is basically the same as example 1, except that the odor control sustained-release particle is composed of a base core and a core film for wrapping the base core, the base core is composed of absorbent powders, vermiculite powders and expansion particles in accordance with the mass ratio of 5:7:2 fully mixed and pressed into a particle size of 12 mm.

Example 5

This example is basically the same as example 1, except that the odor control sustained-release particle is composed of a base core and a core film for wrapping the base core, the base core is composed of absorbent powders, vermiculite powders and expansion particles in accordance with the mass ratio of 7:5:2 fully mixed and pressed into a particle size of 12 mm.

Example 6

This example is basically the same as example 1, except that S102. odor covering base materials and mixed bacterial solution are prepared, and the odor covering soil is prepared by mixing the odor covering base materials and mixed bacterial solution according to the mass ratio of 7:2.

Example 7

This example is basically the same as example 1, except that S102. odor covering base materials and mixed bacterial solution are prepared, and the odor covering soil is prepared by mixing the odor covering base materials and mixed bacterial solution according to the mass ratio of 9:2.

Example 8

This example is basically the same as example 1, except that the odor covering soil is covered on the surface of the pesticide chemical contaminated soil covered by step S101, with the covering thickness of 30 cm.

Example 9

This example is basically the same as example 1, except that the odor covering soil is covered on the surface of the pesticide chemical contaminated soil covered by step S101, with the covering thickness of 50 cm.

Example 10

This example is basically the same as example 1, except that the method for preparing the odor covering base materials is: 1) weigh a certain amount of straw powders, add 0.5 L distilled water into 1 kilogram of the straw powders and mix well to get the mixed solution; 2) add 4 L hydrogen peroxide per kilogram of the straw powders into the mixed solution, stir for 2 h, and add 2 L ammonia per kilogram of the straw powders into the mixed solution at the same time, and the ammonia is slowly added at the flow rate of 45 mL/min, wherein, the mass fraction of the hydrogen peroxide is 30%, the mass fraction of the ammonia is 28%; 3) solids will be obtained by natural precipitation after reaction, and then dry the solids to obtain the odor covering base materials.

Example 11

This example is basically the same as example 1, except that the method for preparing the odor covering base materials is: 1) weigh a certain amount of straw powders, add 2 L distilled water into 1 kilogram of the straw powders and mix well to get the mixed solution; 2) add 6 L hydrogen peroxide per kilogram of the straw powders into the mixed solution, stir for 3 h, and add 4 L ammonia per kilogram of the straw powders into the mixed solution at the same time, and the ammonia is slowly added at the flow rate of 45 mL/min, wherein, the mass fraction of the hydrogen peroxide is 30%, the mass fraction of the ammonia is 28%; 3)

solids will be obtained by natural precipitation after reaction, and then dry the solids to obtain the odor covering base materials.

Example 12

This example is basically the same as example 1, except that in the the method for preparing the odor covering base materials, the ammonia is slowly added at the flow rate of 40 mL/min.

Example 13

This example is basically the same as example 1, except that in the the method for preparing the odor covering base materials, the ammonia is slowly added at the flow rate of 50 mL/min.

Experimental Example

A contaminated site of a pesticide chemical plant is used as the test site, and soil samples from the test site with the same concentration of ammonia, hydrogen sulfide and toluene are used as the test samples, Each group of test samples is 1 t, which are placed in a treatment bin with the same volume, the contents of ammonia, hydrogen sulfide and toluene in each group of samples are measured, after 24 h of treatment, the contents of ammonia, hydrogen sulfide and toluene in each group of samples are measured respectively, and the removal rates of ammonia, hydrogen sulfide and toluene are calculated, Embodiments 1-13 are used to treat a group of test samples respectively to explore the influence of different factors on the odor reduction effect of the pesticide chemical contaminated soil, as follows:

1) Taking Embodiments 1, 2 and 3 as examples, and a control example is set at the same time, the control example is basically the same as example 1, except that vermiculite powders and expansion particles are replaced in equal amount with the absorbent powders for the odor control sustained-release particles in the control example, and the removal rates of ammonia, hydrogen sulfide and toluene after 24 h of treatment are calculated respectively, as shown in Table 1 below:

TABLE 1

Removal rates of ammonia, hydrogen sulfide and toluene after treatment in Embodiments 1, 2 and 3

| Group | Ammonia | Hydrogen Sulfide | Toluene |
| --- | --- | --- | --- |
| Example 1 | 96.89% | 87.75% | 92.01% |
| Example 2 | 92.21% | 84.27% | 86.32% |
| Example 3 | 96.95% | 88.04% | 92.23% |
| Control Example | 87.03% | 80.25% | 82.77% |

It can be seen from Table 1 above that the use of different odor control sustained-release particles has a certain impact on the removal rate of odor gas, wherein, the odor reduction treatment effect of example 3 is better, but the method for reducing odor of example 3 is not significantly improved compared with example 1, but its dosage increases, resulting in increased treatment costs, therefore, from the perspective of economy, example 1 is relatively superior;

At the same time, it can be seen from the comparison between the control example and the example 1, by changing the odor control sustained-release particles, the treatment effect of the control example is still lower than that of the Example 1 on the premise of increasing the absorbent powders, it can be seen that the invention can effectively coordinate and promote the odor treatment effect of the pesticide chemical contaminated soil through setting the odor control sustained-release particles.

2) Taking Embodiments 1, 4 and 5 as examples, respectively calculate the removal rates of ammonia, hydrogen sulfide and toluene after 24 h of treatment, as shown in Table 2 below:

TABLE 2

Removal rates of ammonia, hydrogen sulfide and toluene after treatment in Embodiments 1, 4 and 5

| Group | Ammonia | Hydrogen Sulfide | Toluene |
| --- | --- | --- | --- |
| Example 1 | 96.89% | 87.75% | 92.01% |
| Example 4 | 93.47% | 85.11% | 86.89% |
| Example 5 | 94.21% | 86.57% | 87.33% |

It can be seen from Table 2 above that the use of different base core ratios has a certain impact on the removal rates of odor gas, wherein the odor reduction treatment effect of Example 1 is better.

3) Taking Embodiments 1, 6 and 7 as examples, respectively calculate the removal rates of ammonia, hydrogen sulfide and toluene after 24 h of treatment, as shown in Table 3 below:

TABLE 3

Removal rates of ammonia, hydrogen sulfide and toluene after treatment in Embodiments 1, 6 and 7

| Group | Ammonia | Hydrogen Sulfide | Toluene |
| --- | --- | --- | --- |
| Example 1 | 96.89% | 87.75% | 92.01% |
| Example 6 | 91.55% | 84.27% | 86.37% |
| Example 7 | 91.73% | 85.31% | 86.51% |

It can be seen from Table 3 above that the use of different ratios of the odor covering soil has a certain impact on the removal rates of odor gas, wherein the odor reduction treatment effect of Example 1 is better.

4) Taking Examples 1, 8 and 9 as examples, respectively calculate the removal rates of ammonia, hydrogen sulfide and toluene after 24 h of treatment, as shown in Table 4 below:

TABLE 4

Removal rates of ammonia, hydrogen sulfide and toluene after treatment in Embodiments 1, 8 and 9

| Group | Ammonia | Hydrogen Sulfide | Toluene |
| --- | --- | --- | --- |
| Example 1 | 96.89% | 87.75% | 92.01% |
| Example 8 | 94.32% | 85.79% | 89.57% |
| Example 9 | 97.02% | 87.89% | 92.32% |

It can be seen from the above Table 4 that the adoption of different cover thicknesses has a certain impact on the removal rates of odor gas, wherein the odor reduction treatment effect of Example 9 is better, but by comparison, it is found that Example 9 has no significant improvement in the removal rate compared with Example 1, therefore, from the perspective of economy, Example 1 is relatively superior.

5) Taking Embodiments 1, 10 and 11 as examples, respectively calculate the removal rates of ammonia, hydrogen sulfide and toluene after 24 h of treatment, as shown in Table 5 below:

TABLE 5

Removal rates of ammonia, hydrogen sulfide and toluene after treatment in Embodiments 1, 10 and 11

| Group | Ammonia | Hydrogen Sulfide | Toluene |
| --- | --- | --- | --- |
| Example 1 | 96.89% | 87.75% | 92.01% |
| Example 10 | 93.43% | 86.24% | 87.12% |
| Example 11 | 94.12% | 86.93% | 87.57% |

It can be seen from the above Table 5 that different methods for preparing the odor covering base materials have a certain impact on the removal rates of odor gas, wherein the odor reduction treatment effect of Example 1 is better.

6) Taking Examples 1, 12 and 13 as examples, respectively calculate the removal rates of ammonia, hydrogen sulfide and toluene after 24 h of treatment, as shown in Table 6 below:

TABLE 6

Removal rates of ammonia, hydrogen sulfide and toluene after treatment in Embodiments 1, 12 and 13

| Group | Ammonia | Hydrogen Sulfide | Toluene |
| --- | --- | --- | --- |
| Example 1 | 96.89% | 87.75% | 92.01% |
| Example 12 | 94.37% | 86.58% | 88.42% |
| Example 13 | 93.78% | 86.34% | 87.96% |

It can be seen from the above Table 6 that different methods for preparing the odor covering base materials have a certain impact on the removal rates of odor gas, wherein the odor reduction treatment effect of Example 1 is better.

The invention claimed is:

1. A method for reducing odor in remediation of pesticide chemical contaminated soil, comprising the following steps:
   (S101) covering a pesticide chemical contaminated soil including preparing odor control sustained-release particles spreading the odor control sustained-release particles on the surface of the pesticide chemical contaminated soil;
   (S102) covering the pesticide chemical contaminated soil again, including preparing odor covering base materials and mixed bacterial solution and preparing the odor covering soil by mixing the odor covering base materials and mixed bacterial solution, and then covering the odor covering soil on the surface of the pesticide chemical contaminated soil by step (S101);
   (S103) heating the surface of the pesticide chemical contaminated soil including inserting heating rods into the pesticide chemical contaminated soil covered by step (S102), and heating the surface layer of the pesticide chemical contaminated soil to 30-40° C., and using the odor control sustained-release particles and the odor covering soil to reduce the odor of the pesticide chemical contaminated soil; wherein the odor control sustained-release particles are composed of a base core and a core film for wrapping the base core, wherein the base core is composed of absorbent powders, vermiculite powders and expansion particles in accordance with a mass ratio of 5-7:5-7:2 that are fully mixed and pressed into a particle size of 10-15 mm, wherein the core film is a degradable film; wherein, the expansion particles are composed of sodium bicarbonate and tartaric acid in accordance with a mass ratio of 4:1 that are mixed and pressed into a particle size of pp2-5 mm; wherein the absorbent powder is one or more mixtures of bamboo charcoal powders and activated carbon powders; wherein a method for preparing the odor covering base materials including
   1) adding 0.5-2 L distilled water into each kilogram of straw powders and mixing well to get the mixed solution;
   2) adding 4-6 L hydrogen peroxide per kilogram of straw powders into the mixed solution, stirring for 2-3 h, and adding 2-4 L ammonia per kilogram of straw powders into the mixed solution, and slowly adding the ammonia at the flow rate of 40-50 mL/min, wherein, a mass fraction of the hydrogen peroxide is 30%, and a mass fraction of the ammonia is 28%; and
   3) Obtaining solids by natural precipitation after reaction, and then drying the solids to obtain the odor covering base materials; wherein the mixed bacterial solution is composed of one or more of *Burkholderia, Bacillus Subtilis, Taueria, Comamonas, Pseudomonas*, shortwave *Monomonas*; wherein the odor covering soil is a mixer of the odor covering base materials and mixed bacterial solution mixed according to the mass ratio of 7-9:2.

2. The method for reducing odor in remediation of pesticide chemical contaminated soil according to claim 1, which is characterized in that the dosage of the odor control sustained-release particles is 3-10% of the total weight of the pesticide chemical contaminated soil.

3. The method for reducing odor in remediation of pesticide chemical contaminated soil according to claim 1, which is characterized in that a thickness of the surface layer of the odor covering soil covered on the pesticide chemical contaminated soil covered in step (S101) is 30-50 cm.

* * * * *